Jan. 6, 1953 H. CARMICHAEL 2,624,564
BALANCE
Filed June 22, 1950 4 Sheets-Sheet 1
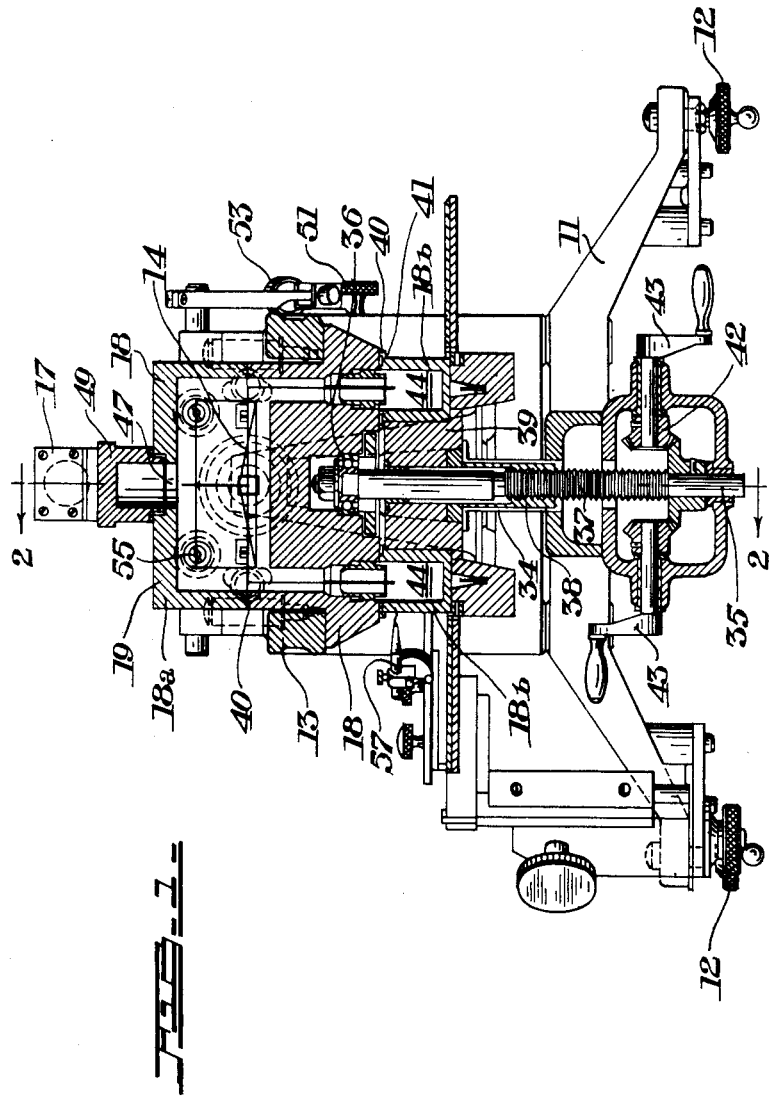
INVENTOR
HUGH CARMICHAEL
BY Smart Biggar
ATTYS

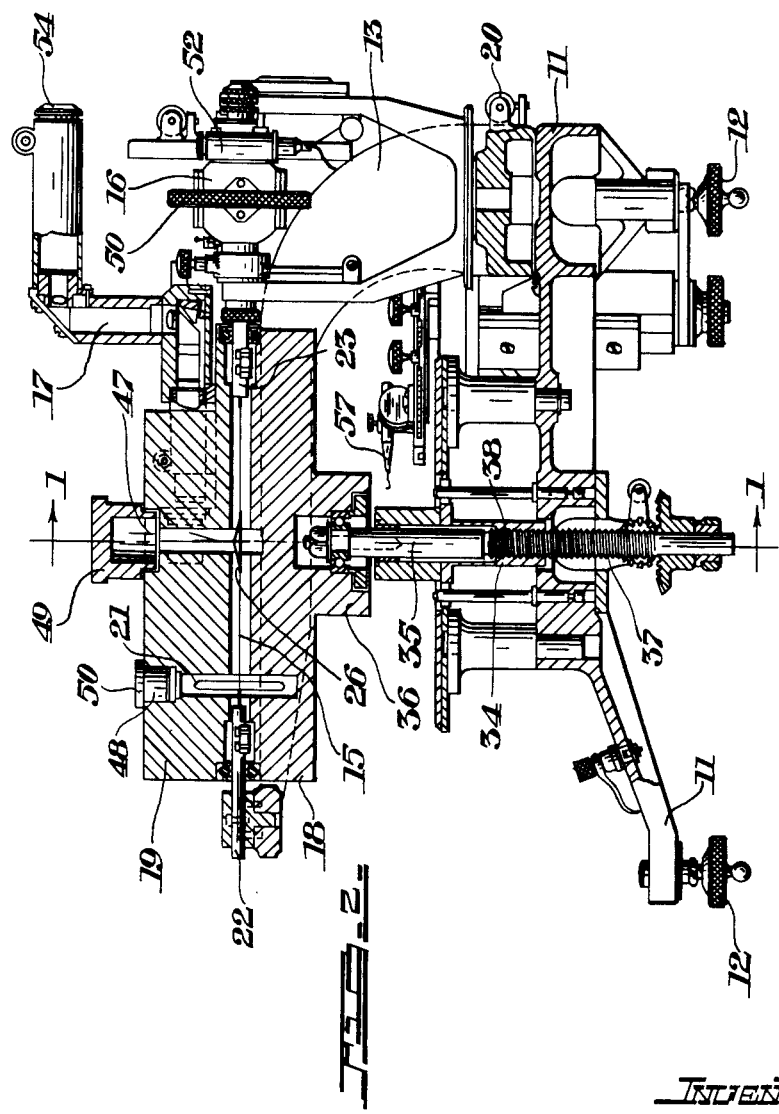

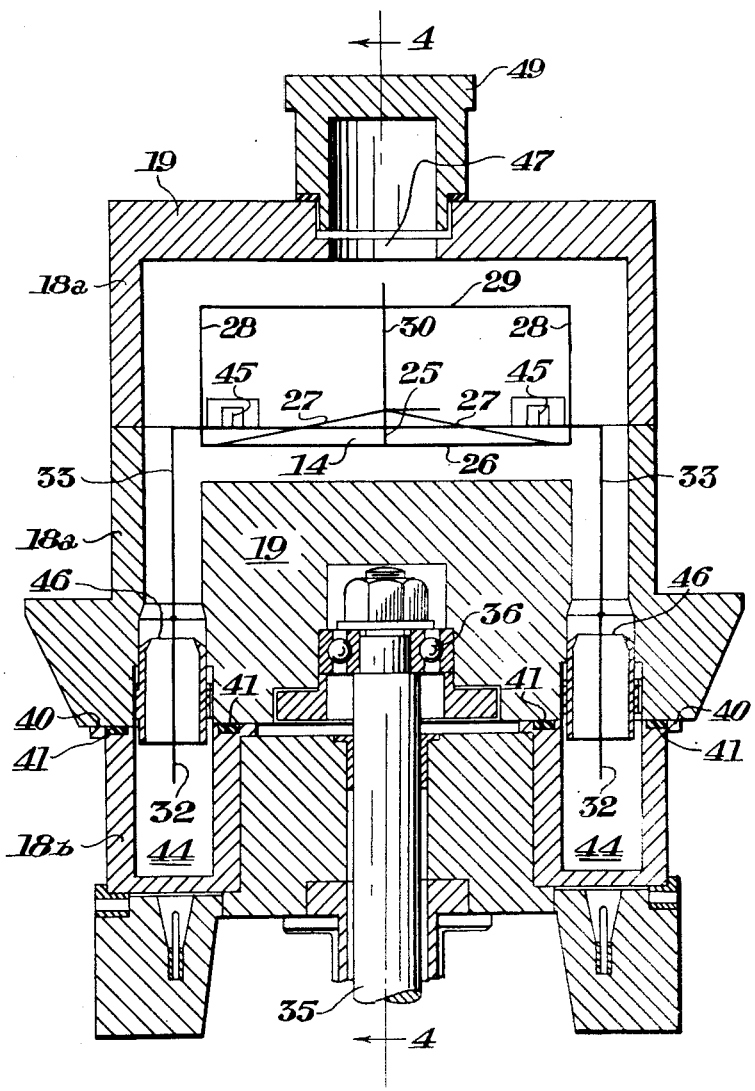

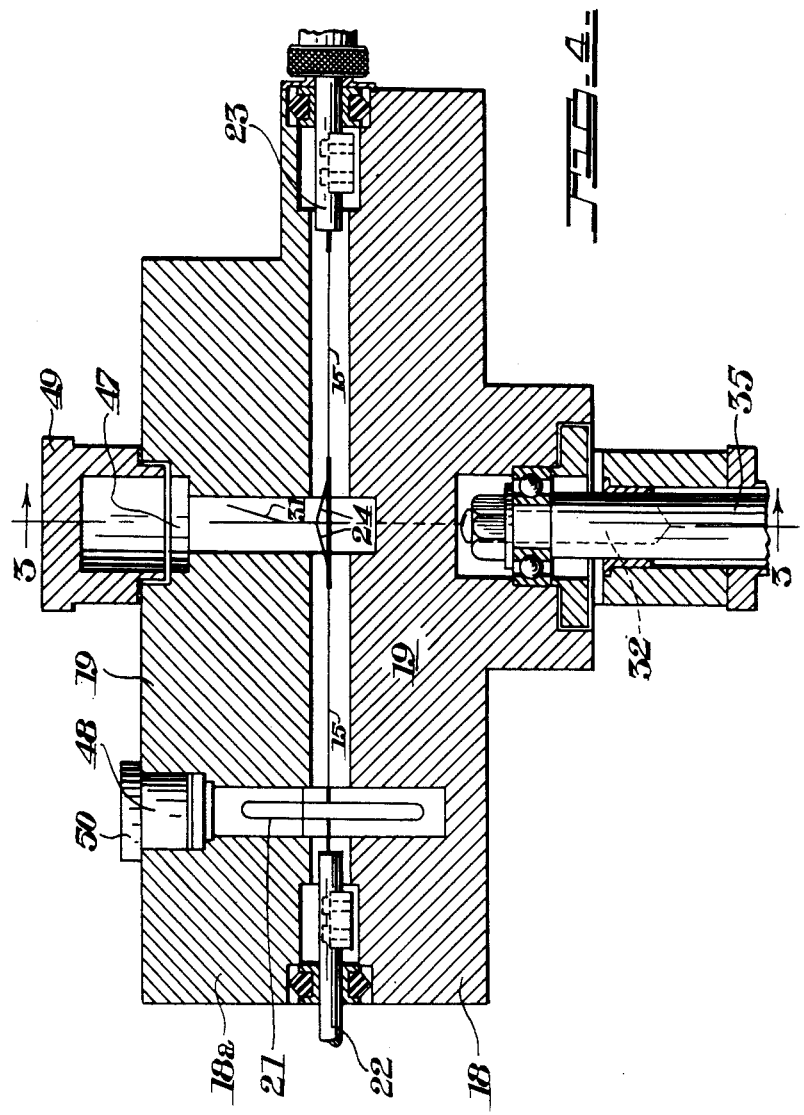

Patented Jan. 6, 1953

2,624,564

UNITED STATES PATENT OFFICE 2,624,564

BALANCE

Hugh Carmichael, Deep River, Ontario, Canada, assignor to The Ministry of Supply Application June 22, 1950, Serial No. 169,677
In Canada March 17, 1950

4 Claims. (Cl. 265—54)

1

The invention relates to balances and is particularly concerned with sensitive balances of the torsion type for the measurement of weight.

Torsion balances usually have a rigid frame in which the torsion fibre is mounted with one end of the fibre fixed to the frame and the other end arranged to be rotated through several revolutions by a graduated dial to apply torsion to the fibre. The balance beam of the balance is fixed at its centre to the torsion fibre in a transverse direction to that of the torsion fibre, and it is made rigid enough to support the scale pans and the masses to be weighed. A small mass is weighed by first balancing the empty scale pans, then placing the mass to be weighed in one of the scale pans, and finally using the graduated dial to twist the torsion fibre thereby balancing the balance beam. The angle of twist applied to the torsion fibre as read from the graduated dial is a measure of the weight of the mass. The fibres used for the torsion fibre and the balance beam are usually quartz fibres formed by heating a quartz rod to a plastic state and then pulling a fibre from the heated rod. Quartz is particularly suited for use as a torsion fibre since it has no elastic hysteresis and is capable of greater elastic deformation than most other materials.

A torsion balance may have a sensitivity in the order of $\pm 5 \times 10^{-9}$ grams and, therefore, great care must be taken during use of the balance if an accurate measurement is to be obtained within a reasonable length of time. One of the chief difficulties in making a rapid and accurate measurement with a torsion balance is the effect on the balance, in particular on the resting position, of the balance beam caused by convection air currents set up near the balance beam by temperature changes, or more or less steady differences of temperature, occurring in the vicinity of the balance.

It has been the practice to totally enclose the balance beam and the torsion fibre in a box-like casing to prevent air currents in the room where the balance is being used from affecting the measurements. However, the air currents or radiant heat in the room affected the temperature of the walls of the casing and consequently temperature differences appeared inside the casing and convection air currents were set up within the casing. In addition to the convection air currents set up by temperature changes, there were air currents set up manually by the operator while loading and adjusting the balance. Also the heat from the operator's body would often affect one side of the casing and cause convection air currents within the casing. These difficulties were so serious that it often took several hours for the balance to come to rest so that a reading could be obtained, and it was often necessary for the operator to make the reading at a considerable distance from the casing so that the heat of the operator's body would not cause the balance of the balance beam to be disturbed.

Attempts have been made to overcome the difficulty caused by convection air currents, and torsion balances have been built in which the torsion fibre, the balance beam and its load support arms have been enclosed in a tube-like casing of poor heat conductivity thereby restricting the volume of air about the working parts of the balance and restraining the conduction of heat along the enclosing casing. In addition to the close fitting tubular casing, an outer casing as described above was often provided. However, these arrangements did not prove to be a practical solution to the problem, and in some cases appeared to add to the difficulty since if a temperature variation did occur within the inner or the outer casing it took a longer time for the temperature variations to be equalized throughout the casings and the balance. This difficulty was particularly troublesome in one prior art arrangement in which a multi-wall close-fitting casing was used about the balance with the result that the spaces between the walls were insulating to heat and when a temperature difference did occur within the walls it took a great length of time for the temperature of all the walls and the temperature of the air within the walls to be equalized.

According to the invention, temperature equalization in a balance is quickly obtained by providing a casing of good heat conductivity arranged about the working parts of the balance so that the casing provides substantially direct heat conductive paths from one load support arm to the other, and from each load support arm to the balance beam throughout its length. A balance according to the invention comprises a balance beam having two spaced apart load support arms extending downward from the balance beam with a casing of good heat conductivity surrounding the balance beam and each of the load support arms, and substantially continuously filling the space between the load support arms. It is preferred that the balance beam and the load support arms form generally an inverted U-shape with the working openings or spaces in the casing allowing only enough space about the balance beam and the load support arms to allow for movement of the balance beam and the load support arms during balancing. In a preferred form of the invention, the casing is in the form of a block of metal having a good heat transfer coefficient, for example, silver which has a coefficient of 0.006, copper which has a coefficient of 0.004, or aluminum which has a coefficient of 0.002.

Preferably, according to the invention, the part of the casing extending between the load support arms should provide a wall thickness of approximately 1.5 times to 6 times the thickness of the space about the balance beam and the load support arms. If the thickness of the casing is below this range, its heat transfer capacity is smaller and a longer time for temperature equalization is required. If the thickness of the casing is above this range, heat entering the casing may flow in a divergent manner instead of directly to the opposite side of the casing where it is most required to provide rapid temperature equalization. In this connection, although an oval shaped casing has been found satisfactory, it is preferred that the sides of the casing be parallel to prevent unnecessary divergence of the heat. It is also preferred that the exterior surface of the casing have a high polish since it will then have a good coefficient of reflection of heat which, to a certain extent, will prevent absorption of heat by the casing.

Measurements of weight are quickly obtained with a balance according to the invention due to the very small amount of time required for the balance beam to come to rest even after the casing has had one of its sides subjected to a severe temperature variation. For example, when one side of the balance has been subjected to a temperature variation, such as may be caused by heat from the operator's body or by the cooling effect of an air current, there may be convection currents set up within the casing in the space about the balance beam and its load support arms. However, due to the casing being composed of a mass of metal of good heat conductivity, the temperature of the complete casing will be quickly equalized, and the convection air currents within the casing cease since their causes have been removed. In a balance according to the invention, the balance beam will come to rest in a few minutes after a temperature variation of the casing has occurred which, in previously known balances, would have required several hours for the balance beam to come to rest.

The invention will be further described by reference to the attached drawings which illustrate an embodiment of it, and in which:

Figure 1 is a sectional view of a torsion balance according to the invention;

Figure 2 is a sectional view of the balance shown in Figure 1 and taken on the line 2—2 of Figure 1;

Figure 3 is a section taken in the same plane as the section shown in Figure 1, and showing the casing of the balance beam at a greater scale; and Figure 4 is a section of the casing of the balance beam taken on the line 4—4 of Figure 3.

The torsion balance shown in the drawings as an embodiment of the invention comprises, in general, as shown in Figures 1 and 2, a base 11 resting on three levelling screws 12 and supporting a frame 13. The base 11 and the frame 13 are rigid metallic castings which serve to support the mechanically movable parts of the balance such as the quartz fibre balance beam 14, the quartz torsion fibre 15, the graduated dial 16, the optical system 17 and the lower section 18b of the casing 19 which encloses the balance beam 14 and the torsion fibre 15. Spirit levels 20, one of which is shown in Figure 2, are mounted on the frame 13 to aid in the levelling of the instrument by the levelling screws 12.

As shown in Figures 2 and 4, one end of the torsion fibre 15 is attached to a rectangular spring 21 of quartz fibre which is held by a holder 22 fixed to the frame 13 at one end of the casing 19. The other end of the torsion fibre 15 is held by a holder 23 which is attached to the graduated dial 16 and is arranged to be rotated by it for applying twist to the torsion fibre 15.

The balance beam 14 is suspended by the torsion fibre 15 and is connected to the torsion fibre 15 through quartz out-riggers 24 (Figures 2 and 4). The balance beam 14 is a trussed beam having a central strut 25, a cross member 26 and diagonal members 27. At the ends of the beams are upright members 28 which support a horizontal index fibre 29. A central support member 30 extends upwardly from the centre of the beam across the index fibre 29 and attached to it is a fibre 31 (see Figures 2 and 4) which may be cut or bent to adjust the centre of gravity of the beam. Elongated loops 32 of quartz fibre are suspended from the ends of the beams by load support arms 33 formed of quartz fibres, and the elongated loops 32 are arranged so that scale pans may be hooked to them.

The casing 19 is supported by the frame 13 and is divided in three sections 18, 18a and 18b with the dividing line between sections 18 and 18a falling in the same horizontal plane as the torsion fibre 15. The dividing line between sections 18a and 18b is along a line 40 (see Figures 1 and 3) and gaskets 41 are provided to seal the joint between the two sections. The middle section of the casing 19, section 18, is permanently fixed to the frame 13 while the lower section 18b is arranged to be lowered and raised by a screwjack 34, and the upper section 18a is arranged to be removed when necessary to adjust or replace the balance beam 14. The shaft 35 of the screwjack 34 is fixed to the section 18 of the casing 19 by a bearing 36, and the shaft 35 has a threaded section 37 which extends through the internally threaded part 38 of the screwjack 34. The internally threaded part 38 is fixed to the section 18b of the casing 19 as shown in Figure 1 and is arranged so that rotation of the shaft 35 will raise or lower the section 18b of the casing 19. At the lower end of the shaft 35 of the screwjack 34, there are arranged gears 42 which are operated by cranks 43. Operation of the cranks 43 causes the shaft 35 to be revolved, which in turn causes the internally threaded part 38 to move upwardly or downwardly, depending on the direction of rotation of the shaft 35. The section 18b of the casing 19 is provided with cup-like cavities 44 which surround the lower ends of the elongated loops 32 and which are large enough to accommodate the scale pans. Mechanical loading fingers 57 are arranged so that a mass to be weighed, or a standard weight, may be transferred directly from them to the scale pans.

The casing 19 is provided with stops for the balance arm 14 in the form of knife edges 45 at the upper side of the diagonal members 27 (Figures 1 and 3), as well as stops 46 which are in the form of knife edges surrounding the upper ends of the elongated loops 32. The knife edges 45 provide sufficient clearance for movement of the balance arm 14 during normal weighing operation but which prevent the balance arm 14 from oscillating with an amplitude which might cause damage to the quartz fibre suspension. The knife edges 46 support the elongated loops 32 while loading the balance so as to prevent damage to the load support arms 33. The casing 19 is provided with openings 47 and 48 having caps 49 and 50. Removal of the caps 49 and 50 provides for inspetcion of the rectangular spring 21 and of the connection between the balance beam 14 and the torsion fibre 15.

The graduated dial 16, which may be of a conventional type, is mounted on the frame 13 and arranged to be used to rotate the holder 23 to apply twist to the torsion fibre 15. The graduated dial 16 is used during weighing to obtain a reading based on the angle of twist of the torsion fibre 15 required to balance the balance beam 14. The graduated dial 16 may be calibrated in terms of weight units so that a direct reading of the weight of the mass being weighed can be obtained. The graduated dial 16 is provided with a main adjusting knob 50 and a fine adjusting knob 51 (see Figures 1 and 2). A light 52 (Figure 2) is provided to aid in the taking of a reading from the graduated dial 16.

The optical system 17 is mounted on the frame 13 by an axle resting in V slots so that the optical system can be adjusted through a vertical angle by the adjusting screw 53 (Figure 1). The optical system 17 comprises an eyepiece 54 (Figure 2) and various lenses and prisms in a conventional arrangement which provides an optical system for viewing simultaneously each end of the index fibre 29 of the balance beam 14. As shown in Figure 1, the optical system 17 has two microscopic objective lenses 55 which are in the same horizontal plane as the index fibre 29. Images of each end of the index fibre 29 are formed and transmitted to the eyepiece 54 which has a vertically divided field for viewing the two images simultaneously to provide an indication when the balance beam 14 is balanced. The arrangement for adjusting the optical system 17 through a vertical angle is provided so that the optical system may be made to follow the index fibre 29 as the index fibre is displaced slightly in a vertical direction due to the addition of weights to the load arms 33.

Since a torsion balance as shown in the drawings has a high sensitivity, only the best materials and workmanship should go into its construction, and it is important that the casing 19 which encloses the balance beam 14, the torsion fibre 15 and the load support arms 33 be made of a material of good heat conductivity, for example, a metal such as aluminum, copper or alloys of these metals. The casing 19 should be massive, preferably in the form of a block of the metal which has been cut into sections as shown in the drawings and has had openings milled in it for the parts of the balance. While it may be more suitable to manufacturing processes to have the massive casing extend about the torsion fibre 15 as shown in the drawings, it is not essential that the massive part of the casing should do so to obtain rapid temperature equalization in accordance with the invention. The large mass of metal of the casing 19 left between the load support arms 33 provides the direct heat conductive paths between the various parts of the balance which are required for rapid temperature equalization in the balance.

The operation of the torsion balance shown in the drawings is similar to that of known types of torsion balances and, therefore, is only briefly described. The balance is loaded by lowering the section 18b of the casing 19 by turning one of the cranks 43 and using the mechanical fingers 51 to load the load arms 33 of the balance by means of scale pans or by directly hanging the mass to be weighed on an elongated loop 32. A small mass can be weighed without use of a counterbalancing standard weight, but a counterbalancing weight can be used with heavier mass in accordance with standard procedures. The casing 19 is then closed by raising the section 18b which becomes sealed to the fixed section 18 of the casing due to the gaskets 41. The optical system 17 is next adjusted until the ends of the index fibre 29 can be viewed and the balance beam 14 is brought into balance by adjustment of the graduated dial 16. The balanced condition of the balance beam 14 is indicated by coincidence of the ends of the line images of each end of the index fibre 29 as seen in the vertically divided field of the eyepiece 54.

During the balancing of the balance beam very little, if any, delay will be caused in the weighing operation by the operator being forced to wait for the balance beam to settle down after a disturbance in the temperature of the air surrounding the balance. Temperature disturbances in the casing of the balance are quickly equalized due to the direct heat conductive paths provided by the massive metallic casing of the balance.

While the embodiment of the invention shown in the drawings and described in the specification is a torsion balance, it is to be noted that the invention concerns the providing of direct paths of good heat conductivity in any type of balance having a balance beam and spaced apart load support arms.

What I claim as my invention is:

1. A balance comprising a balance beam having two spaced apart load support arms extending downward from the beam; a casing of good heat conductivity closely and completely enclosing the beam and the load support arms; said casing including a substantially continuous filling of heat conducting metallic material between the load support arms, whereby heat is conducted directly from the vicinity of one load support arm to the vicinity of the other and of the beam.

2. A balance comprising a balance beam having two spaced apart load support arms extending downwardly from the beam; a casing of good heat conductivity closely and completely enclosing the beam and the load support arms; said casing forming an inverted U-shaped cavity for the beam and the load support arms; a substantially continuous filling of heat conducting metal between the load support arms, whereby heat is conducted directly from the vicinity of one load support arm to the vicinity of the other and of the beam.

3. A balance as claimed in claim 2 in which the substantially continuous filling of heat conducting metal, in a direction at right angles to the direction of the balance beam, is from 1.5 to 6 times as thick as the U-shaped cavity for the balance beam and the load support arms.

4. A balance as claimed in claim 2 in which the sides of the substantially continuous filling of heat conducting metal are substantially parallel.

HUGH CARMICHAEL.

REFERENCES CITED

The following references are of record in the file of this patent:

UNITED STATES PATENTS

| Number | Name | Date |
|---|---|---|
| 2,263,096 | Marchand | Nov. 18, 1941 |
| 2,311,771 | Norgaard | Feb. 23, 1943 |
| 2,594,618 | Booth | Apr. 29, 1952 |

FOREIGN PATENTS

| Number | Country | Date |
|---|---|---|
| 351,828 | Germany | Apr. 13, 1922 |
| 591,690 | England | Aug. 26, 1947 |